United States Patent [19]
Yung et al.

[11] Patent Number: 5,699,718
[45] Date of Patent: Dec. 23, 1997

[54] COFFEE MAKING MACHINES

[75] Inventors: Jimmy Siu Yim Yung; John Duncan McNair, both of Hong Kong, Hong Kong

[73] Assignee: Chiaphua Industries Limited, New Territories, Hong Kong

[21] Appl. No.: 697,333

[22] Filed: Aug. 22, 1996

[51] Int. Cl.[6] .................. A47J 31/30; A47J 31/24
[52] U.S. Cl. .................. 99/292; 99/293; 99/303; 99/290
[58] Field of Search .................. 99/292, 293, 303, 99/290; 426/433

[56] References Cited

U.S. PATENT DOCUMENTS 4,502,371  3/1985  DiLascio .................. 99/293
4,757,753  7/1988  Pandolfi .................. 99/293
5,335,588  8/1994  Mahlich .................. 99/293
5,586,484  12/1996  Piazza .................. 99/292 X

FOREIGN PATENT DOCUMENTS 424011  8/1947  Italy .................. 99/303

Primary Examiner—Reginald L. Alexander
Attorney, Agent, or Firm—Gunn, Lee & Miller, P.C.

[57] ABSTRACT

An expresso coffee maker includes a steam outlet valve for supplying steam to froth milk for making cappuccino coffee. A valve member automatically closes off a tube when a water level in a water compartment falls below a low level. This closing off completes each expresso making cycle and ensures that sufficient water is retained, and sealed off, inside the compartment to sustain a supply of steam for frothing the milk.

6 Claims, 2 Drawing Sheets

COFFEE MAKING MACHINES

BACKGROUND OF THE INVENTION

1. Field of the Invention

The invention relates to coffee making machines.

2. Description of Prior Art

The invention relates more particularly to a machine for making expresso coffee and a cappuccino milk frothing device. It is well-known according to an expresso system to provide a coffee making machine where hot water is forced under pressure through coffee grains and delivered to a coffee container, a jug or cup for example. It is also well-known, but using a separate or different device, to provide a steam driven milk frother where air is forced, using steam pressure, into a quantity of milk to cause it to froth. The frothed milk is poured over a cup of black coffee so providing "cappuccino" coffee. Therefore at present two separate machines or devices are needed which, certainly in a domestic kitchen, represents a significant investment in relation to cost, and in use requires sufficient space for operation of two units.

SUMMARY OF THE INVENTION

It is an object of the invention to overcome or at least reduce this problem.

According to the invention there is provided an expresso coffee maker comprising an electrically heated sealed water compartment, a tube, having two ends, extending down inside the compartment and terminating at one end adjacent a lower inner surface of the water compartment, a coffee compartment connected to the other end of the tube and having an outlet connected to pass coffee to an external container, including automatic valve means arranged to seal off the tube before all the water in compartment has evaporated so as to form a supply for steam for frothing milk, and a manually operable valve arranged to release the steam from the compartment to a frothing nozzle connected to the valve.

The tube may be permanently fixed to a lower surface of the coffee compartment.

The coffee compartment may be a cup-shaped and fit snugly inside an upper end of the water compartment.

The valve means may comprise a valve member mounted inside the tube that remains below a seating during a normal upward flow of water and that moves upwards against a seating when the water is replaced by higher velocity water vapour and steam.

The manually operable valve may be mounted in a side wall of the water compartment adjacent a top of the water compartment, and include a resiliently biassed plunger arranged to be moved against its bias to open the valve, and in which the plunger is slidable transversely to the side wall.

BRIEF DESCRIPTION OF THE DRAWINGS

Coffee makers according to the invention will now be described by way of example with reference to the accompanying drawings in which.

DESCRIPTION OF THE PREFERRED EMBODIMENTS

Figure 1:
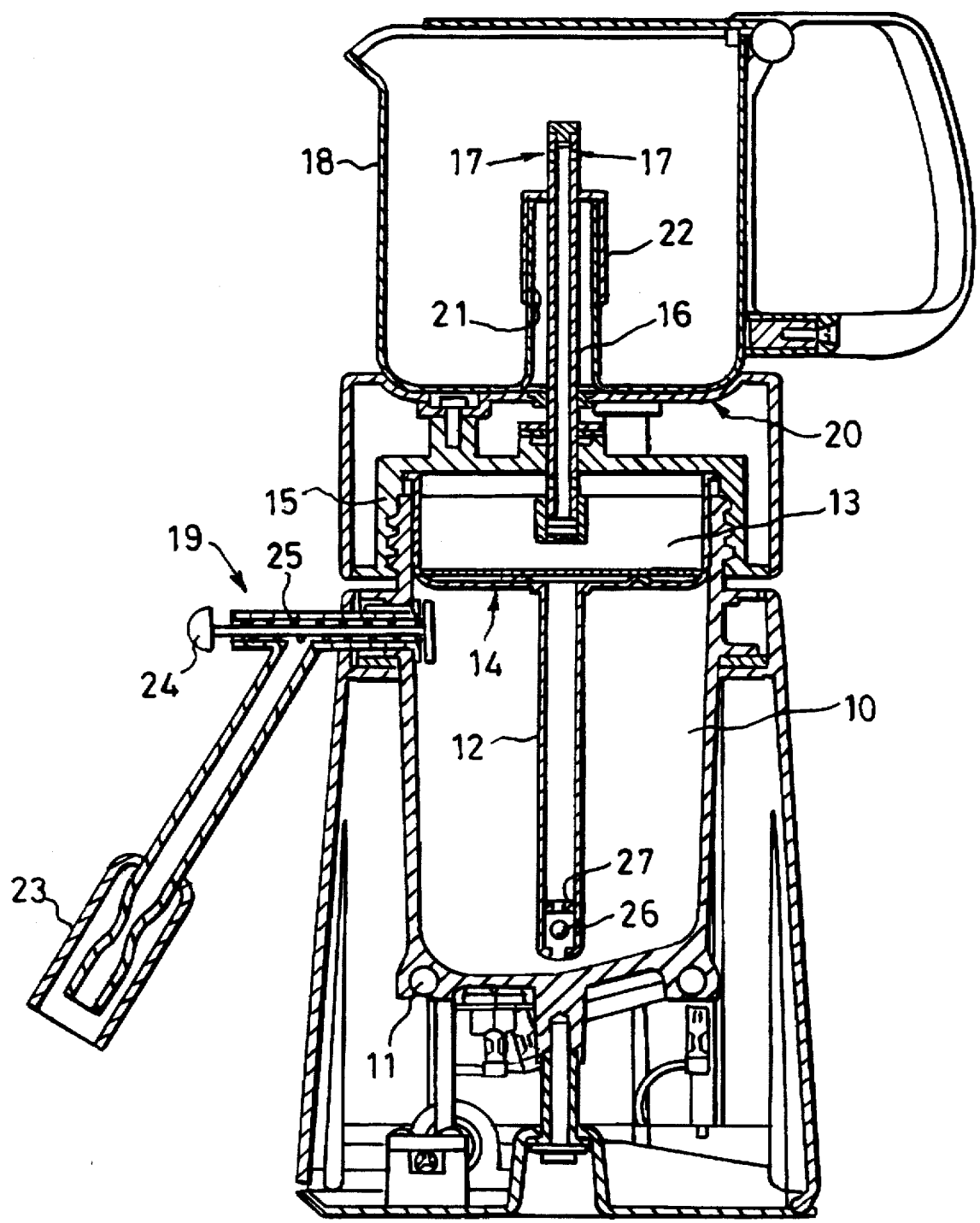
FIG. 1 is a sectional side view of one coffee maker.

Referring to the drawings, in FIG. 1 the coffee maker comprises a hot water compartment 10 provided with an electrical heating coil 11 at its base. A tube 12 extends up from one end which is adjacent an inner lower surface of the compartment 10 and is integrally formed or fixed to a coffee compartment 13 comprising a cup-shaped tray 14 closed by a screwed lid 15. An outlet for the coffee compartment is provided by an upstanding tube 16 which is closed at its upper end and has outlet nozzles 17 adjacent its upper end. In use, hot water is forced up the tube 12 by pressure generated in the compartment 10 as the water begins to evaporate. The hot water is forced through coffee grains placed in the coffee compartment 13 so that coffee (expresso style) is pushed out of the nozzles 17. In principle, the coffee maker as so far described is already well-known.

The coffee maker shown in the drawing is however different to known expresso coffee makers in two respects. Firstly, an external coffee receiving vessel 18 having a central inlet is mounted directly above the coffee compartment 13. Secondly, the coffee maker has a steam outlet 19 fitted in a wall adjacent a top of the water compartment 10 and an automatic control means for ensuring that a supply of water for steam remains available after all the coffee has been made, as will be described more fully below.

The coffee maker has a support platform 20 formed in an outer top surface of the lid 15. The vessel 18 is formed with a raised central inlet 21 that extends up to well above a lower surface of the vessel. The inlet 21 is formed as or provided with a flexible seal 22 that surrounds the tube 16 and seals between atmosphere below the vessel 18 and the inside of the vessel. The seal 22 is located in use below the nozzles 17 and the vessel is filled, when coffee is made, to a level below the top of the seal 22. Also in use, the seal 22 serves in part at least to locate the vessel 18 in position so allowing the seal to act and position the vessel 18 in a balanced central sealing location. The seal 22 may have a flap (not shown) resiliently attached to cover over the top of the inlet 21 when the container 18 is removed away from the platform 20.

The axes of the nozzles 17 are preferably inclined so as to cause coffee to flow downwards from the nozzles into the vessel 18. It will be appreciated that the facility of being able to place the vessel centrally and directly on top of the water and coffee compartments leads to a simplified design, especially for the tube 16 as the coffee is delivered centrally to the vessel 18, and the described coffee maker also requires a relatively small area of working and storing surfaces.

As the steam outlet 19 is mounted adjacent the upper end of the water compartment 10, during use and as long as there is hot water in the compartment, steam can be exhausted from the compartment. Such steam is required for driving air through milk to cause it to froth. The frothed milk is used for pouring over a cup of black coffee to provide so-called "cappuccino coffee". The steam draws air in through sides of a frothing nozzle 23, using a venturi effect, and the air causes the frothing of the milk. A milk frothing nozzle as such is well-known. The outlet 19 comprises a manually operable valve which includes a pressure release plunger 24 that is biased by a spring 25. If the plunger 24 is pressed towards the compartment 10, steam is released into the nozzle 23.

Normally in a conventional expresso coffee maker a measured amount of water is initially placed in the compartment 10 and the lid 15 screwed in position. All or substantially all the water is then allowed to heat up so that hot water and steam will be forced out of the compartment 10 through the tube 12. In the described embodiment however, a quantity of water is prevented from evaporating or leaving the compartment 10. This is because at some stage, the tube 12 is automatically sealed off before the compartment 10 is completely empty of water. This is achieved by a valve member 26 comprising a steel ball and seating ring 27 which are positioned inside the tube 12 adjacent its lower end. Whenever the water level falls below the lower end of the tube 12, a steady flow of water up the tube ceases and is replaced by high velocity water vapour and steam. Impact on the valve member therefore increases and the valve member 26 is lifted up. Thereafter steam pressure inside the compartment 10 holds the valve member 26 firmly against the surface of the sealing ring 27. Thus, at the end, or the effective end, of each coffee making process, the compartment 10 is sealed off by the valve member 26 and a sufficient quantity of water will remain available for producing any steam that is required to froth milk when desired. A quantity of steam remains available because once the valve member 26 seals off the tube 12, steam can only escape or be released normally via the outlet 19.

The described coffee maker thus provides a generally known method of making expresso coffee although embodiments of the invention have a more compact form. Such compact form leads to significant practical advantages in simplifying manufacture and the saving of space. The described coffee maker also produces a reliable supply of steam for frothing milk, using the same heating vessel as for the making of the coffee. Thus embodiments can be regarded as, combined in one apparatus, expresso and cappuccino coffee makers.

It is possible to incorporate other automatic valve arrangements to ensure all the water is not used up to make coffee and/or that the outlet for the hot water is sealed off automatically at any appropriate time as required. For example, a float may be placed in the container 10 that operates a lever to close off a valve mounted somewhere in the tube 12. A flexible duck-bill type valve may also be used attached to the lower end of the tube that remains effectively open in the presence of water but closes off automatically, to seal the end of the tube 12, when the water level falls below its inlet orifice so that it is exposed only to water vapour and steam.

Figure 2:
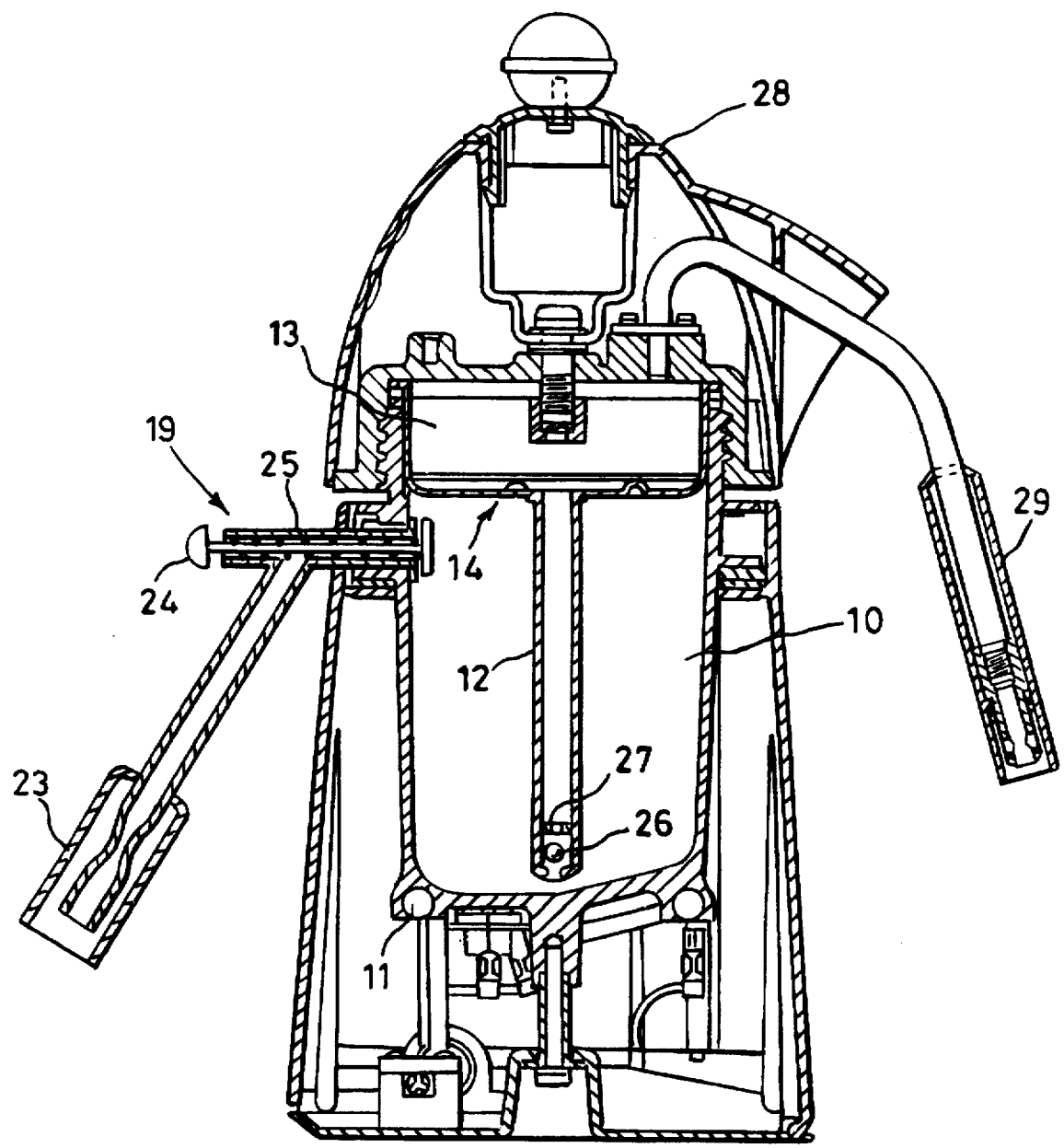
FIG. 2 is a sectional side view of another coffee maker.

In FIG. 2, the coffee maker is similar to the coffee maker of FIG. 1 except that it is provided with a domed lid 28 and a coffee outlet 29. As described earlier, a valve member 26 is provided to seal off the tube 12 and to signify the end of each coffee making cycle. The automatic action of the valve member ensures that a supply of water and steam are available for steam release out of the outlet 19.

We claim:

1. An expresso coffee maker comprising an electrically heated sealed water compartment, a tube, having two ends, extending down inside the compartment and terminating at one end adjacent a lower inner surface of the water compartment, a coffee compartment connected to the other end of the tube and having an outlet connected to pass coffee to an external container, including automatic valve means arranged to seal off the tube before all the water in compartment has evaporated so as to form a supply for steam for frothing milk, and a manually operable valve arranged to release the steam from the compartment to a frothing nozzle connected to the valve.

2. A coffee maker according to claim 1, wherein the tube is permanently fixed to a lower surface of the coffee compartment.

3. A coffee maker according to claim 2, in which the coffee compartment is a cup-shaped and fits snugly inside an upper end of the water compartment.

4. A coffee maker according to claim 1, in which the valve means comprises a valve member mounted inside the tube that remains below a seating during a normal upward flow of water and that moves upwards against a seating when the water is replaced by higher velocity water vapour and steam.

5. A coffee maker according to claim 1, in which the manually operable valve is mounted in a side wall of the water compartment adjacent a top of the water compartment, and includes a resiliently biassed plunger arranged to be moved against its bias to open the valve, and in which the plunger is slidable transversely to the side wall.

6. An express coffee maker comprising an electrically heated sealed water compartment, a tube, having two ends, extending down inside the compartment and terminating at one end adjacent a lower inner surface of the water compartment, a coffee compartment connected to the other end of the tube and having an outlet connected to pass coffee to an external container, including automatic valve means arranged to seal off the tube before all the water in compartment has evaporated so as to form a supply for steam for frothing milk, and a manually operable valve arranged to release the steam from the compartment to a frothing nozzle connected to the valve, the manually operable valve, mounted in a side wall of the water compartment adjacent a top of the water compartment, having a resiliently biassed plunger arranged to be moved against its bias to open the valve, the plunger slidable transversely to the side wall.

* * * * *